US010165409B2

(12) United States Patent
Roberts et al.

(10) Patent No.: US 10,165,409 B2
(45) Date of Patent: *Dec. 25, 2018

(54) SYSTEM AND METHOD FOR LOCATING NODES WITHIN A WIRELESS NETWORK

(71) Applicant: Calix, Inc., Petaluma, CA (US)

(72) Inventors: Harold Roberts, Excelsior, MN (US); Jeffrey Buffum, Bolton, MA (US); Jason Dove, Novato, CA (US)

(73) Assignee: Calix, Inc., Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/652,352

(22) Filed: Jul. 18, 2017

(65) Prior Publication Data

US 2017/0318429 A1 Nov. 2, 2017

Related U.S. Application Data

(63) Continuation of application No. 14/568,332, filed on Dec. 12, 2014, now Pat. No. 9,716,979.

(51) Int. Cl.
*H04W 4/02* (2018.01)
*G01S 5/08* (2006.01)
*G01S 5/12* (2006.01)
*H04W 72/04* (2009.01)

(52) U.S. Cl.
CPC ........... *H04W 4/025* (2013.01); *G01S 5/08* (2013.01); *G01S 5/12* (2013.01); *H04W 72/046* (2013.01)

(58) Field of Classification Search
CPC ....... H04W 64/00; H04W 4/02; H04W 4/025; H04W 64/006; H04W 72/0446; H04W 16/28; H04W 72/042; H04W 72/046; H04W 24/10; H04W 4/04; H04W 74/006; G01S 5/10; H04B 7/0617; H04B 7/04; H04B 7/0626; H04B 7/0695; H04B 7/10; H04B 17/309; H04B 7/0608; H04L 5/0051; H04L 67/12; H04L 1/0031; H04L 5/00

See application file for complete search history.

(56) References Cited

U.S. PATENT DOCUMENTS

| 6,061,021 | A | 5/2000 | Zibell |
| 9,716,979 | B2 | 7/2017 | Roberts et al. |
| 2004/0246903 | A1 | 12/2004 | Huang et al. |
| 2009/0212921 | A1 | 8/2009 | Wild et al. |
| 2013/0028246 | A1 | 1/2013 | Gonikberg |
| 2014/0274112 | A1 | 9/2014 | Vitek et al. |
| 2014/0370912 | A1 | 12/2014 | Kurby et al. |
| 2015/0049826 | A1 | 2/2015 | Liu et al. |

(Continued)

OTHER PUBLICATIONS

"U.S. Appl. No. 14/568,332, Final Office Action dated Jan. 3, 2017", 13 pgs.

(Continued)

*Primary Examiner* — Daniel Lai
(74) *Attorney, Agent, or Firm* — Schwegman Lundberg & Woessner, P.A.

(57) ABSTRACT

A system and method for determining the location of nodes within a network. Beamforming coefficients associated with signals transmitted from a first node to a second node are determined and, based on the beamforming coefficients, direction is determined between the first and second nodes. Distance is determined as a function of direction and the location of the second node is determined as a function of distance and direction.

28 Claims, 4 Drawing Sheets

(56) References Cited

U.S. PATENT DOCUMENTS

2016/0174040 A1  6/2016  Roberts et al.

OTHER PUBLICATIONS

"U.S. Appl. No. 14/568,332, Non Final Office Action dated Jun. 30, 2016", 11 pgs.
"U.S. Appl. No. 14/568,332, Notice of Allowance dated Apr. 4, 2017", Examiner Interview Summary from Apr. 4, 2017 included, 12 pgs.
"U.S. Appl. No. 14/568,332, Response filed Mar. 17, 2017 to Final Office Action dated Jan. 3, 2017", 13 pgs.
"U.S. Appl. No. 14/568,332, Response filed Oct. 19, 2016 to Non Final Office Action dated Jun. 30, 2016", 10 pgs.
"U.S. Appl. No. 14/568,332, Response filed Oct. 19, 2016 to to Non Final Office Action dated Jun. 30, 2016", 10 pgs.
Bahillo, Alfonso, et al., "Distance Estimation Based on 802.11 RTS/CTS Mechanism for Indoor Localization", Advances in Vehicular Networking Technologies, Published InTech., 21 pgs, Apr. 2011.
Hoene, et al., "Four-way TOA and Software-Based Trilatération of IEEE 802.11 Devices", (Sep. 2009).
Hoene, Christian Dr., "Low-Cost WLAN Based Time-of-Flight Trilateration", Precision Indoor Personnel Location and tracking for Emergency Responders, Third Annual Technology Workshop, Aug. 5, 2008., 19.
Izquierdo, et al., "Performance evaluation of a TOA-based trilatération method to locate terminals in WLAN", (Oct. 19, 2005).
Zhuo, Jie, et al., "Experimental Studies on Direction Finding Via Blind Beamforming", Institute of Acoustic Engineering, Northwestern Polytechnical University, Xi'an, Shannxi, 710072, P.R. China, 4, 2007.

SYSTEM AND METHOD FOR LOCATING NODES WITHIN A WIRELESS NETWORK

PRIORITY

This application is a continuation of U.S. patent application Ser. No. 14/568,332, filed Dec. 12, 2014, which is incorporated by reference herein in its entirety.

BACKGROUND

Wireless local area networks (LANs) such as Wi-Fi provide high-speed data distribution for both home and business. With the advent of new mechanisms for improved signal quality enabling higher speeds, Wi-Fi has become one of the most universally accepted wireless distribution mechanisms for the wireless LAN service space. As we have become more reliant on Wi-Fi for higher speeds and extended coverage, it has become more important to be able to monitor the Wi-Fi network for performance degradation and to apply corrections.

One of the methods for improving signal quality in Wi-Fi LANs is beamforming. Beamforming can be likened to phased array signal generation, commonly used in radar, in that by adjusting the relative phases of an array of signals emanating from an array of antennas, the combined signal can be formed such that the phases of each antenna signal will constructively interfere at the desired target.

Beamforming has become a standard option with the advent of IEEE 802.11ac, which includes specific protocol to enhance the ability of an Access Point (AP) and Station (STA) to effectively use what is called "explicit beamforming." Explicit beamforming requires that the STA and AP communicate received signal information over that protocol to optimize the beamforming process.

SUMMARY

Figure 1:
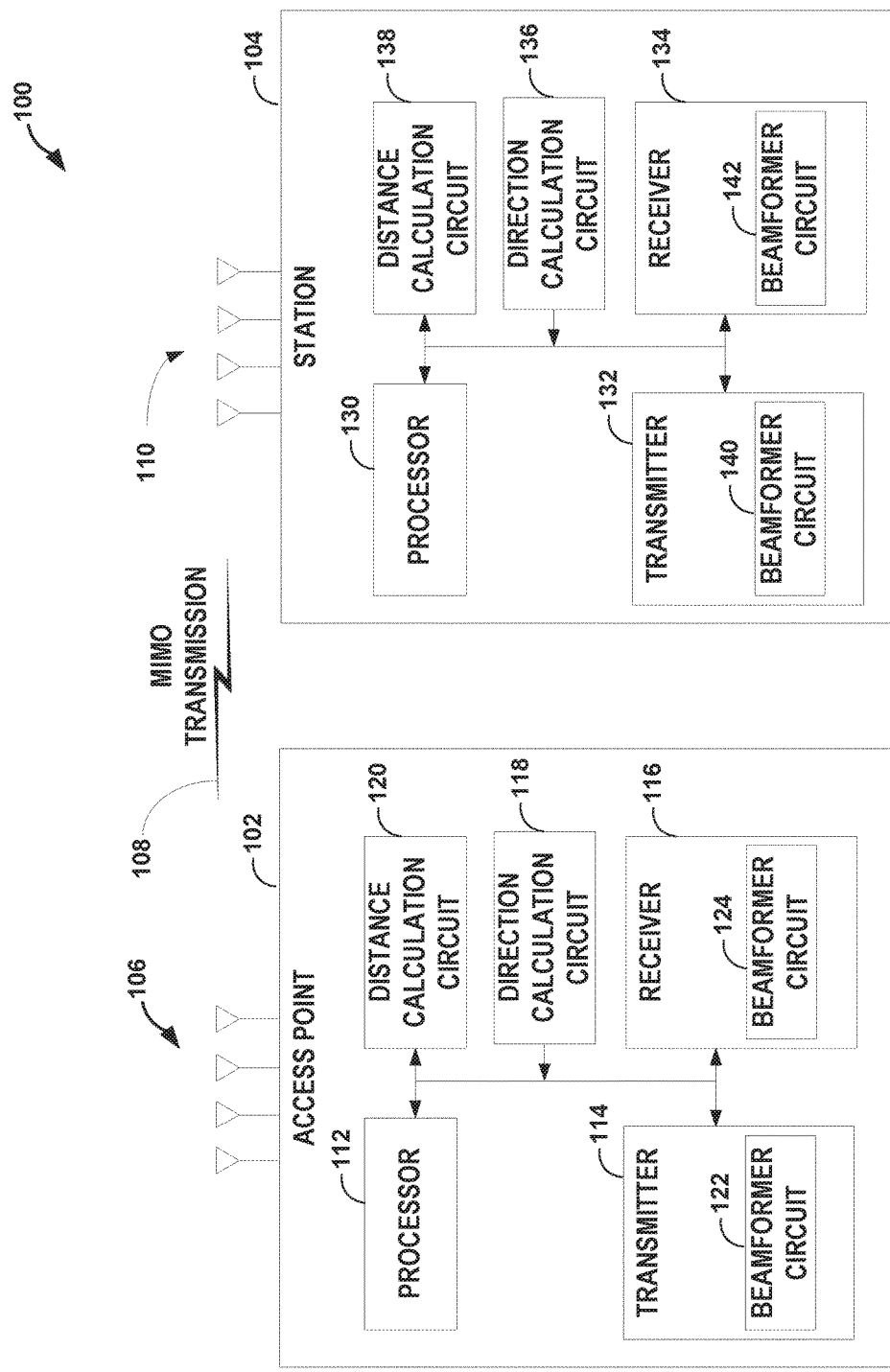
FIG. 1 illustrates an example of a wireless network that can implement various techniques of this disclosure.

In general, this disclosure is directed to techniques for determining a location of devices, e.g., Stations (STAs), participating in a Wi-Fi network.

In an example, this disclosure is directed to, in a network having a first and second node, wherein each node includes beamforming coefficients, a method of determining the location of a node, the method comprising determining the beamforming coefficients associated with signals transmitted from the first node to the second node, determining a direction of the second node using the beamforming coefficients, determining a distance between the first node and the second node as a function of time of flight and direction, and determining a location of the second node as a function of distance and direction.

In another example, this disclosure is directed to, in a network having including a first, second and third node, wherein each node includes beamforming coefficients, a method of determining the location of a node, the method comprising determining the beamforming coefficients associated with signals transmitted from the first node to the second node and the beamforming coefficients associated with signals transmitted from the third node to the second node, and determining a direction of the second node from the first and third nodes using the beamforming coefficients, and determining a location of the second node as a function of direction from each of the first and third nodes and the location of the first and third nodes.

DETAILED DESCRIPTION

This disclosure is directed to techniques for determining a location of devices, e.g., Stations (STAs), participating in a Wi-Fi network. Existing techniques utilize three or more access points with known locations to triangulate STAs within an indoor environment. These techniques can be sufficient for indoor environments such as shopping malls, airports or businesses, for example, with many access points available for triangulation. However, these techniques do not work in spaces where only one or two access points are available. With just one or two access points, it is impossible to use simple triangulation because three or more access points are needed for triangulation.

In addition, when STAs participate in a Wi-Fi network within an indoor environment (for example, homes, stores, and coffee shops), location mechanisms such as Global Positioning Satellite (GPS) location detection may not be available to locate the STAs.

The techniques described in this disclosure solve the problem where only one or two access points are available. In addition, the techniques in this disclosure can enhance triangulation accuracy when three or more access points are available. This disclosure describes using locating techniques that utilize beamforming information and round trip delay (RTD) information to obtain position information without the use of GPS.

As mentioned above, beamforming has become a standard option for Wi-Fi networks with the advent of IEEE 802.11ac. The IEEE 802.11ac standard includes the ability of an Access Point (AP) and Station (STA) to use "explicit beamforming" to improve signal-to-noise in communications between APs and STAs. With explicit beamforming, the STAs and APs communicate received signal information in order to optimize the beamforming process.

Beamforming directs a radiated signal power in the direction of the target client, e.g., STA, and can improve the signal-to-noise ratio at the target client's receive antennas. Beamforming can also be used in a receive sense to "null" the interfering signals that would impair the signal-to-noise ratio at the receiver. With transmit or receive beamforming, there is a radiated (or received) signal pattern in three dimensions such that the strongest signal lobe is desirably directed to the target client. The direction of the strongest signal lobe can be determined with relation to the Wi-Fi AP or STA within a three dimensional axis coordinate system aligned with the AP or STA using the beamforming coefficients and a Wi-Fi radio/antenna system that has been characterized (e.g., calibrated).

FIG. 1 depicts a wireless network 100 that can implement various techniques of this disclosure. The wireless network 100, e.g., a Wi-Fi network, can include a single AP 102 (first node) and a single STA 104 (second node). An access point, such as AP 102, is a wireless communication device that, in some examples, can be considered to be, and can include at least some of the functionality of, a base station. An access point can provide access for one or more stations, e.g., STA 104, to a wired network. A station, such as STA 104, can be a fixed or mobile wireless communication device, such a laptop or portable computer with wireless communication capability, a smart phone, a tablet computer, a personal digital assistant, a wireless telephone, a wireless headset, a television, a set-top box, or other device that may receive and/or transmit information wirelessly.

AP 102 and STA 104 can communicate using Multiple-Input/Multiple-Output (MIMO) transmission protocols in accordance with an IEEE 802.11 standard, such as the IEEE 802.11ac standard. As seen in FIG. 1, the AP 102 can include a plurality of antennas, e.g., four antennas, shown generally at 106. The antennas 106 can be, for example, omnidirectional antennas. The AP 102 can transmit a MIMO transmission 108 to the STA 104. The STA 104 can include a plurality of antennas, e.g., four antennas, shown generally at 110. The antennas 110 can be, for example, omnidirectional antennas. The STA 104 can transmit a signal back to the AP 102 on a plurality of communication paths, e.g., four communication paths.

The AP 102 can include a processor 112, a transmitter 114, a receiver 116, a direction calculation circuit 118, and a distance calculation circuit 120. The transmitter 114 can include a beamformer circuit 122. For each of the plurality of antennas 106, the processor 112 can determine beamforming coefficients of a signal to be transmitted, e.g., a phase and amplitude, by the transmitter 114, e.g., based on received signal strength. The beamformer circuit 122 of the transmitter 114 can apply the beamforming coefficients to the signal to be transmitted. By applying the beamforming coefficients to the signal to be transmitted, the AP 102 can steer the strongest signal lobe toward the STA 104. Similarly, the receiver 116 can include a beamformer circuit 124. For each of the plurality of antennas 106, the beamformer circuit 124 of the receiver 116 can apply the beamforming coefficients to the received signal.

The STA 104 can include a processor 130, a transmitter 132, a receiver 134, a direction calculation circuit 136, and a distance calculation circuit 138. The transmitter 132 can include a beamformer circuit 140, and the receiver 134 can include a beamformer circuit 142. These components of STA 104 are similar to those of AP 102 and, for purposes of conciseness, will not be described again.

The techniques described in this disclosure use beamforming information to determine a direction of a received signal and round trip delay (RTD) information to determine a distance of a received signal, thereby obtaining position information of the STA 104, without the use of GPS, where only two devices, e.g., one AP and one STA, are available. Using beamforming techniques, the direction calculation circuit 118 of the AP 102 can determine the direction of arrival (DOA) of a signal source, e.g., a signal transmitted by STA 104, based on the strength of phases of signals received by the antennas 106.

Once the AP 102 has the direction to a device such as a STA 104, it can determine a distance to the device. To estimate a distance to the STA 104, the distance calculation circuit 120 of the AP 102 can use RTD information. For example, the distance calculation circuit 120 can determine RTD information based on the difference in time between a transmitted Request-to-Send (RTS) signal and a received Clear-to-Send (CTS) Wi-Fi signal, e.g., using IEEE standard 802.11. Using the calculated RTD information, the distance calculation circuit 120 can estimate a distance since the electromagnetic signals between the AP 102 and the STA travel at a speed very close to the speed of light.

In other embodiments, distance can be calculated via a four-way time-of-arrival (TOA) determination such as is described by Hoene in *Low Cost WLAN based Time-of-flight Trilateration*, Precision Indoor Personnel Location and Tracking for Emergency Responders, Third Annual Technology Workshop, Aug. 5, 2008. Hoene details two different four-way time of flight (TOF) calculations based on the use of a combination of RTS, CTS, a data transmission and an ACK to determine a round-trip time of flight that can be used to determine distance between objects. Hoene also details ways to overcome quantization due to clock frequencies in typical APs 102 and STAs 104. The description of four-way TOF calculations, the use of a third node to monitor transmissions and calculate time of flight, and the techniques for overcoming the effects of quantization are incorporated herein by reference.

In one embodiment, the AP 102 can transmit an RTS, receive a CTS response back from the STA 104, transmit a data packet to the STA 104 and receives back an ACK from the STA 104. In such an embodiment, distance is a function of time of flight ($t_{TOF}$) for two trips from AP 102 to STA 104 and two trips back and can be calculated as:

$$t_{TOF} = \tfrac{1}{4} * (t_{3S} - t_{0S} - t_{DATA} - t_{CTS} - t_{RTS} - 3t_{SIFS})$$

where $t_{3S}$ is the time the ACK is received at AP 102, $t_{0S}$ is the time RTS is sent by the AP 102, $t_{DATA}$ is the time needed to transmit the data packet, $t_{CTS}$ is the time needed to transmit the CTS signal, $t_{SIFS}$ is the short interframe space (SIFS) period, and $t_{RTS}$ is the time needed to transmit the RTS signal. In one embodiment, successive measurements of $t_{TOF}$ are binned and used to generate a continuous distribution whose center is indicative of $t_{TOF}$ without the quantization effects.

Figure 2:
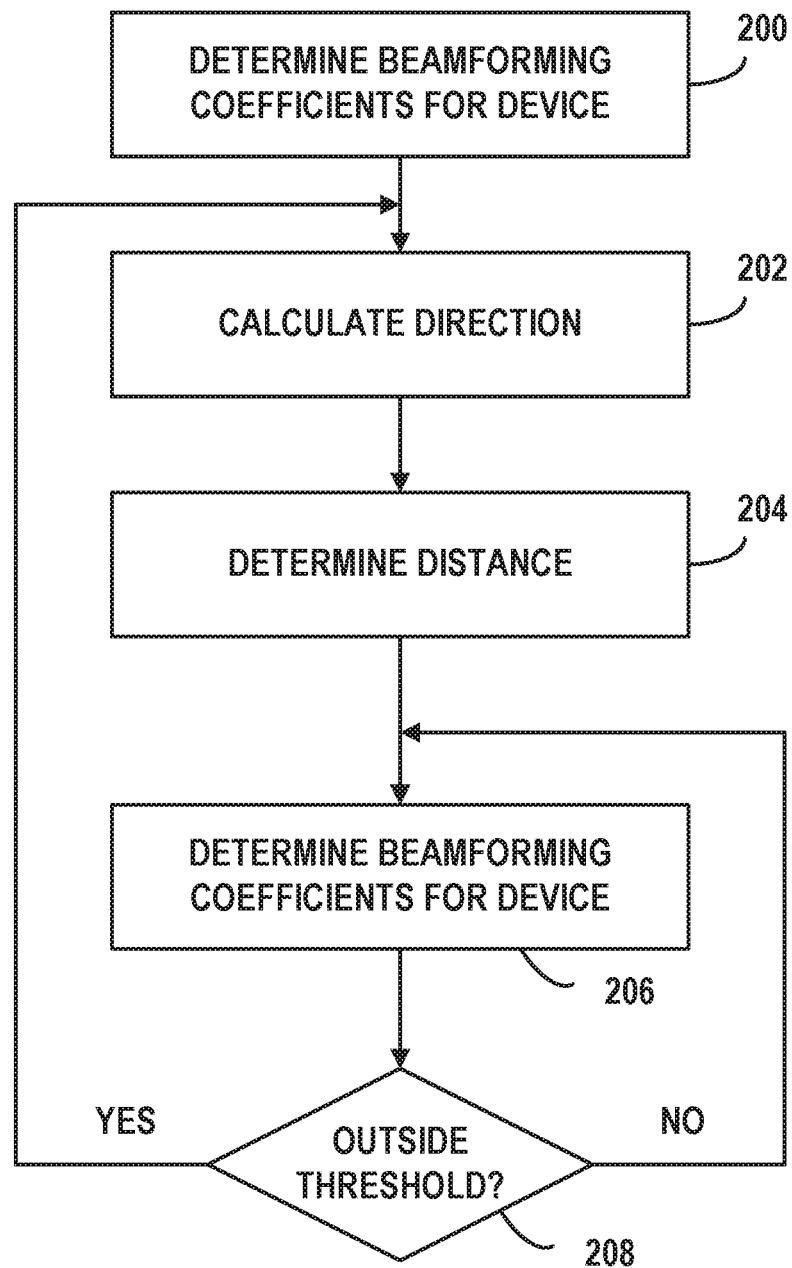
FIG. 2 illustrates a method of determining a location of a target client in the wireless network of FIG. 1.

FIG. 2 illustrates a method of determining a location of a target client in the wireless network of FIG. 1. In the example approach of FIG. 2, the AP 102 determines the beamforming coefficients associated with signals to be transmitted to the STA 104 (block 200). The AP 102 calculates a direction to the STA 104 using the beamforming coefficients for transmissions to STA 104 (block 202). The AP 102 can then determine a distance to the STA 104, e.g., using RTD information (block 204). In this manner, the AP 102 can determine a location to the STA 104.

In some embodiments, the AP 102 can vary its beamforming coefficients over time as it tries to maintain the highest possible signal strength. In some such embodiments, the AP 102 can determine a change in direction when the beamforming coefficients change more than a threshold amount. The AP 102 can determine the beamforming coefficients associated with signals to be transmitted to the STA 104 (block 206). Then, the AP 102, e.g., the processor 112, can compare the beamforming coefficients associated with signals to be transmitted to the STA 104 to a threshold, for example, to determine whether the coefficients have changed enough to require a new determination of distance and direction (block 208).

If the coefficients are outside the threshold ("YES" branch of block 208), control can move to block 202, and the AP 102 can calculate a direction to the STA 104 as a function of the beamforming coefficients for transmissions to STA 104.

If, however, the beamforming coefficients associated with signals to be transmitted to STA 104 have not changed enough to require a new determination of direction or distance ("NO" branch of block 208), control can move to block 206, and AP 102 once again can determine the beamforming coefficients associated with signals to be transmitted to the STA 104.

Figure 3:
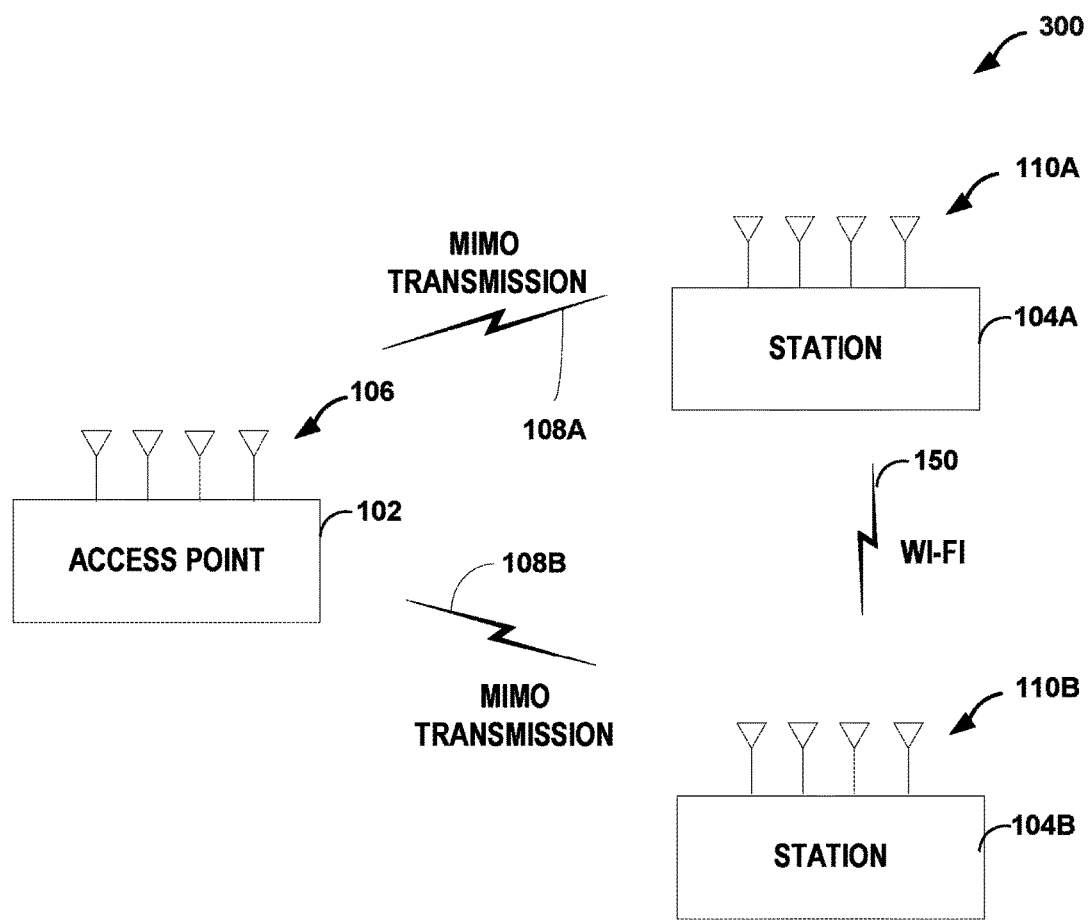
FIG. 3 illustrates another example of a wireless network that can implement various techniques of this disclosure.

FIG. 3 depicts another wireless network 300 that can implement various techniques of this disclosure. FIG. 3 depicts one access point, namely AP 102 (first node), and two target clients, namely a STA 104A (second node) and a STA 104B (third node). The STAs 104A, 104B are similar to the STA 104 of FIG. 1 and will not be described in detail. As seen in FIG. 3, the AP 102 can communicate with the APs 104A, 104B using MIMO transmissions 108A, 108B, respectively. In addition, the STAs 104A, 104B can communicate with one another using Wi-Fi signals 150.

In accordance with this disclosure, beamforming techniques can be combined with triangulation techniques to more accurately determine location information for two or more target clients, e.g., STA 104A and STA 104B. Using the techniques described above, the AP 102 can determine estimated distance and direction information to both the STA 104A and the STA 104B.

In addition, in some example implementations, the STA 104A can determine a distance to the STA 104B, e.g., using Wi-Fi signals 150 via the RTD technique. In some embodiments, TDLS (Tunneled Direct Link Setup) can be used to establish STA to STA direct communication and again, determine RTD. In one embodiment, STAs 104A, 104B can use RTD to determine STA to STA separation. In another embodiment, STAs 104A, 104B can use beamforming coefficients to determine signal direction to other STA 104 (not depicted). In yet another embodiment, STAs 104A, 104B can use RTD to determine STA to STA separation and use beamforming coefficients to determine signal direction.

One or both of the STA 104A, 104B can transmit the determined distance information between STA 104A and STA 104B to the AP 102. Using the additional information, the distance calculation circuit 120 of the AP 102 can recalculate the distances to the STA 104A and the STA 104B to increase the resolution of the calculation.

In some embodiments, the AP 102 can monitor transmissions between the STA 104 and the STA 104B, and the AP 102 can calculate a time of flight ($t_{TOF}$) in order to determine a distance. In one such embodiment, the STA 104A can transmit an RTS to the STA 104B, receive a CTS response back from the STA 104B, transmit a data packet to the STA 104B, and receive back an ACK from the STA 104B. In such an embodiment, the AP 102 can monitor the RTS, CTS, data, and ACK transmission and can calculate a distance that is a function of time of flight ($t_{TOF}$) for two trips from STA 104A to STA 104B and two trips back. For example, the AP 102 can a time of flight by:

$$t_{TOF} = \frac{1}{2} * (t_{2M} - t_{0M} - t_{CTS} - t_{RTS} - 2t_{SIFS})$$

where $t_{2M}$ is the time the data packet is received at the monitoring AP 102, $t_{0M}$ is the time RTS is received by the monitoring AP 102, $t_{CTS}$ is the time needed to transmit the CTS signal, $t_{RTS}$ is the time needed to transmit the RTS signal, and $t_{SIFS}$ is the short interframe space (SIFS) period. As in above, in one embodiment, successive measurements of $t_{TOF}$ are binned and used to generate a continuous distribution whose center is indicative of $t_{TOF}$ without the quantization effects. A distance can be calculated based on the time of flight.

The location information has many uses. In some embodiments, it can be used to diagnose Wi-Fi problems due to STA placement. In some embodiments, it can be used to locate illegitimate STA connections on network 100. In some embodiments, it can be used to determine whether there is interference from devices such as APs and STAs that are not participating in a network, e.g., networks 100, 300, and to determine which of the devices are creating the most significant interference.

Finally, it can be used in some embodiments to identify the location of specific users. In some such embodiments, the information about a user's location can be used for targeted advertising and offers.

It should be apparent that, in open space, the above methods can do a good job determining the direction of each node from other nodes and the distance between nodes. Reflections may reduce the accuracy of both the beamforming location and the RTD calculations. If one or more nodes are in a known location, the location of the nodes in three-dimensional space can also be determined. Therefore, by using beamforming information, distance measurements and triangulation from multiple elements with known locations in the network, one can obtain position information without the use of GPS.

In some embodiments, the accuracy of the time of flight ($t_{TOF}$) calculation can be enhanced if certain stations STA 104A, 104B on the Wi-Fi network have known locations. Such information can be used to help triangulate the locations of other STAs 104 in conjunction with the information from access point 102. In some embodiments, it can also be used to determine if the distance and direction determined for a particular path is a direct line of sight, or a product of one or more reflections.

In one embodiment, the AP 102 can maintain a table of locations, e.g., in a memory, that have been determined for one or more stations, e.g., STAs 104A, 104B. Each time the AP 102 determines a new location for a station, that location can be compared to the location previously determined by the AP 102 or by other stations to see if the location is consistent with what was previously determined. If not, in some embodiments, the AP 102 can determine the most likely location based on the distance and direction information as measured by the AP 102.

In other embodiments, each node (whether an AP 102 or a STA 104A, 104B can) can maintain a table of locations that have been determined for all stations and for the AP 102. Each time a node, e.g., a station or an AP, determines a new location for another node, that location can be compared to the location determined by one or more other nodes to see if the location is consistent with what was determined by other nodes, or even with a location measured previously by the same node. If not, in some embodiments, the node can determine the most likely location based on the distance and direction information as measured by each of the nodes.

Figure 4:
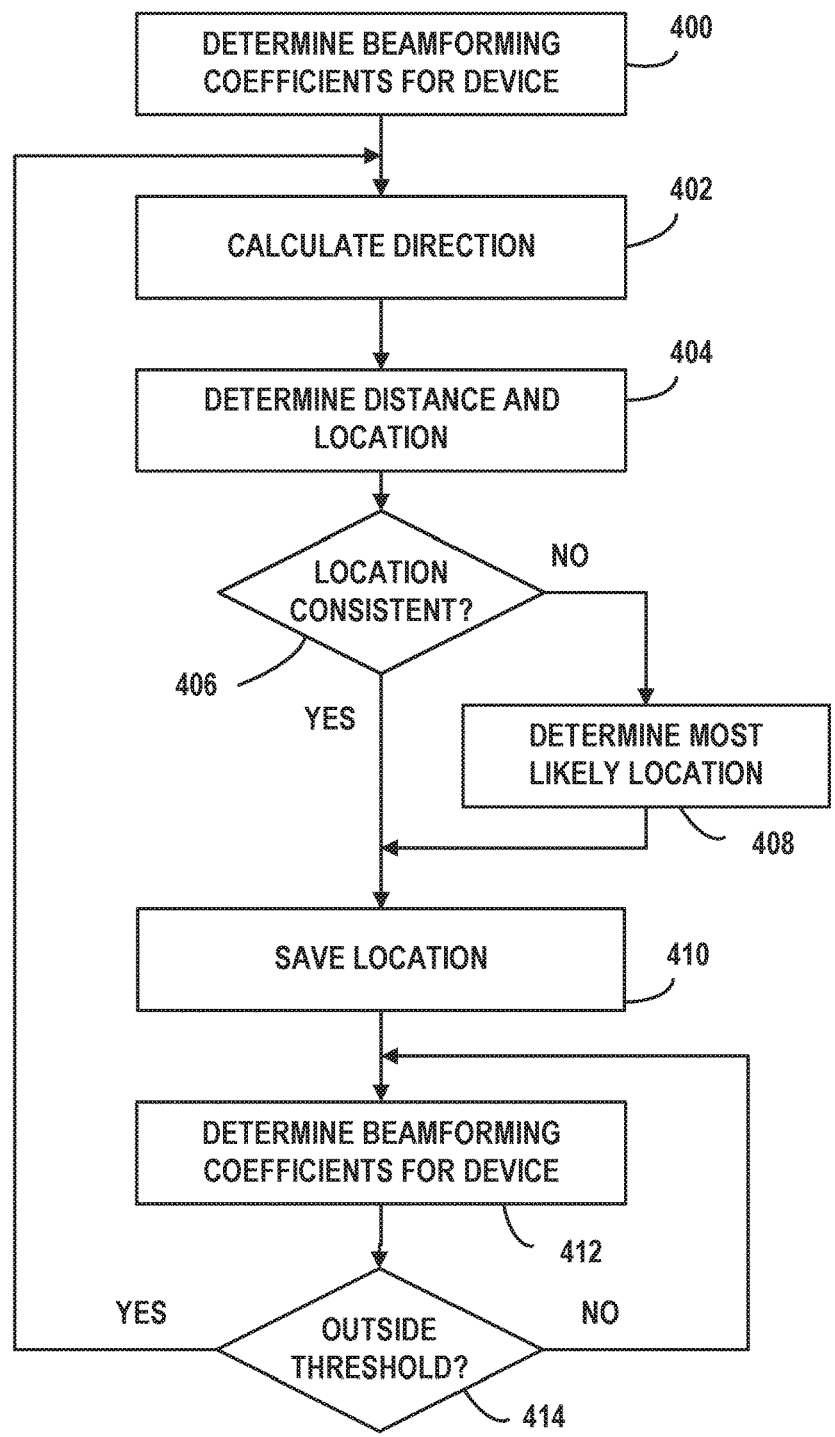
FIG. 4 illustrates another method of determining direction and location of a target client in a wireless network.

FIG. 4 illustrates another method of determining direction and location of a target client in a wireless network. In the example approach of FIG. 4, the AP 102 can determine the beamforming coefficients associated with signals to be transmitted to, for example, the STA 104 (block 400). The AP 102 can calculate a direction to the STA 104 using the determined beamforming coefficients for transmissions to the STA 104 (block 402).

The AP 102 can determine a distance to the STA 104 and then the location of the STA 104 using the determined distance and direction and the location of AP 102 (block 404). The AP 102, for example, can determine whether the newly determined location information is consistent with previous location determinations (block 406). If a determination is made that the location measured is consistent with previous location determinations, ("YES" branch of block 406), control can move to block 410 and the location information can be saved. In some embodiments, the location information can be shared with other nodes.

If a determination is made that the location measured is not consistent with previous location determinations, ("NO" branch of block 406), then the most likely location is determined as a function of the previously calculated location, distance and direction information (block 408). Control then moves to block 410 and the location information can be saved. In some embodiments, the location information can also be shared with other nodes.

The AP 102 can again determine the beamforming coefficients associated with signals to be transmitted to the STA 104 for example (block 412). Next, the AP 102 can determine if the beamforming coefficients associated with signals to be transmitted to STA 104 have changed enough to require a new determination of distance and direction, e.g., whether the change is outside a threshold, (block 414). If so ("YES" branch of block 414), then control moves to block 104B, and AP 102 can calculate a direction to the STA 104 using the beamforming coefficients for transmissions to the STA 104.

If, however, the beamforming coefficients associated with signals to be transmitted to the STA 104 have not changed enough to require a new determination of direction or distance ("NO" branch of block 414), control moves to block 412, and the AP 102 once again can determine the beamforming coefficients associated with signals to be transmitted to STA 104.

A similar approach can be used to detect the location of any of the other stations and to update their tables of node locations.

In some embodiments, AP 102 and STA 104 can include sensors such as accelerometers for detecting when they are moved, the direction they are moved and the distance they are moved. In some such embodiments, a new location can be calculated based on the measured movement and a location table can be updated accordingly. In some embodiments, the new location measured can be updated as necessary based on subsequent distance and direction measurements and location determinations by other nodes.

In some embodiments, location is determined periodically. In some such embodiments, a moving node can be checked for present location more frequently than a static node.

In some environments, multipath is more of a concern. High level reflective signatures make pure direction and time of flight parameters alone inadequate to accurate triangulation of client positions. In some embodiments, beams from signals in two different spectrums can be used to determine distance and direction. In some such embodiments, beams between the two spectrums can be correlated, since 2.4 GHz is more apt to penetrate and 5 GHz is more apt to reflect, so one can better assess whether the direction and time of flight is direct or indirect when communicating between dual-band end-points AP 102 or STA 104. In addition, the two different bands often use different sets of antennas, so it is possible to use the two bands to reduce systematic errors due to sampling at a given frequency. Systematic errors of each band are typically not correlated.

As noted above, GPS has limited capability to detect the location of devices within indoor environments while triangulation alone requires direction measurements from three or more nodes with known locations. By using beamforming information, RTD and triangulation from multiple elements with known locations in the network, position information may be obtained without the use of GPS and in a way that is more accurate than triangulation alone. Furthermore, the method works even if only one or two nodes are available to determine location of the nodes having an unknown location.

What has been discussed above is the use of beamforming coefficients and RTD information to determine the location of a node within a wireless network. Such an approach takes advantage of the use of beamforming protocols inherent to many node radios. In some embodiments, access points such as residential gateways determine the physical location of devices trying to access the access points.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A network access point comprising:
   one or more processors; and
   at least one memory including instructions that, when executed by the one or more processors, cause the one or more processors to perform operations to:
   determine beamforming coefficients associated with signals transmitted, by the network access point, to a second network device;
   determine a direction of the second network device relative to the network access point using the beamforming coefficients;
   determine a distance between the network access point and the second network device as a function of time of flight and direction, wherein the instructions to determine the distance include instructions to:
   transmit, by the network access point, a request-to-send signal to the second network device; and
   receive, by the network access point, a clear-to-send signal from the second network device; and
   determine a location of the second network device as a function of the determined distance and direction.

2. The network access point of claim 1, wherein the instructions to determine the distance include instructions to:
   determine a round trip delay of a signal from one of the network access point and the second network device to the other of the network access point and the second network device.

3. The network access point of claim 1, wherein the instructions to determine the distance include instructions to make a four-way time-of-arrival (TOA) determination.

4. The network access point of claim 1, wherein the instructions to determine the distance include instructions to determine time of flight as a function of a continuous distribution of time of flight measurements.

5. The network access point of claim 1, wherein the instructions to determine the distance include instructions to:
   monitor transmissions between the network access point and the second network devices via a third network device; and
   calculate, based on measurements at the second network device, a time of flight between the network access point and the second network devices.

6. The network access point of claim 1, wherein the instructions to determine the distance include instructions to determine if the network access point or the second network device is moving and adjusting direction accordingly.

7. The network access point of claim 1, wherein the instructions to determine the direction include instructions to determine direction using each of two different bands.

8. A network access point comprising:
   one or more processors; and
   at least one memory including instructions that, when executed by the one or more processors, cause the one or more processors to perform operations to:
   determine beamforming coefficients associated with signals transmitted, by the network access point, to a second network device and beamforming coefficients associated with signals transmitted from a third network device to the second network device;
   determine a direction of the second network device from the network access point and third network devices using the beamforming coefficients; and
   determine a location of the second network device as a function of direction from each of the network access point and the third network device and the location of the network access point and the third network device, wherein the instructions to determine the location include instructions to:
   determine a distance between the network access point and the second network device as a function of time of flight and direction, wherein the instructions to determine the distance include instructions to:
   transmit, via the network access point, a request-to-send signal to the second network device; and
   receive, via the network access point, a clear-to-send signal from the second network device;
   determine a distance between the third network device and the second network device as a function of time of flight and direction, wherein the instructions to determine the distance include instructions to:
   monitor transmission of a request-to-send signal from the third network device to the second network device; and
   monitor transmission of a clear-to-send signal from the second network device to the third network device; and
   determine a location of the second network device as a function of direction and distance from each of the network access point and the third network device and of triangulation from the network access point and the third network device.

9. The network access point of claim 8, wherein the instructions to determine the distance include instructions to determine round trip delay of a signal from one of the network access point and the second network device to the other of the network access point and second network device.

10. The network access point of claim 8, wherein the instructions to determine the distance include instructions to make a four-way time-of-arrival (TOA) determination.

11. The network access point of claim 8, wherein the instructions to determine the distance include instructions to determine a time of flight as a function of a continuous distribution of time of flight measurements.

12. The network access point of claim 8, wherein the instructions to determine the distance include instructions to:
    monitor transmissions between the network access point and the second network device via a third network device; and
    calculate, based on measurements at the second network device, time of flight between the network access point and the second network device.

13. The network access point of claim 8, wherein the instructions to determine the distance include instructions to determine if the network access point or the second network device is moving and adjusting direction accordingly.

14. The network access point of claim 8, wherein the instructions to determine the distance include instructions to determine a direction using each of two different bands.

15. At least one non-transitory machine readable medium including instructions for determining the location of a second network device that, when executed by a network access point, cause the network access point to perform operations to:
   determine beamforming coefficients associated with signals transmitted, by the network access point, to the second network device;
   determine a direction of the second network device relative to the network access point using the beamforming coefficients;
   determine a distance between the network access point and the second network device as a function of time of flight and direction, wherein the instructions to determine the distance include instructions to:
      transmit, by the network access point, a request-to-send signal to the second network device; and
      receive, by the network access point, a clear-to-send signal from the second network device; and
   determine a location of the second network device as a function of the determined distance and direction.

16. The at least one non-transitory machine readable medium of claim 15, wherein the instructions to determine the distance include instructions to:
   determine a round trip delay of a signal from one of the network access point and the second network device to the other of the network access point and the second network device.

17. The at least one machine readable medium of claim 15, wherein the instructions to determine the distance include instructions to make a four-way time-of-arrival (TOA) determination.

18. The at least one non-transitory machine readable medium of claim 15, wherein the instructions to determine the distance include instructions to determine time of flight as a function of a continuous distribution of time of flight measurements.

19. The at least one non-transitory machine readable medium of claim 15, wherein the instructions to determine the distance include instructions to:
   monitor transmissions between the network access point and the second network devices via a third network device; and
   calculate, based on measurements at the second network device, a time of flight between the network access point and the second network devices.

20. The at least one non-transitory machine readable medium of claim 15, wherein the instructions to determine the distance include instructions to determine if the network access point or the second network device is moving and adjusting direction accordingly.

21. The at least one non-transitory machine readable medium of claim 15, wherein the instructions to determine the direction include instructions to determine direction using each of two different bands.

22. At least one non-transitory machine readable medium including instructions for determining the location of a second network device that, when executed by a network access point, cause the network access point to perform operations to:
   determine beamforming coefficients associated with signals transmitted, by the network access point, to the second network device and beamforming coefficients associated with signals transmitted from a third network device to the second network device;
   determine a direction of the second network device from the network access point and third network devices using the beamforming coefficients; and
   determine a location of the second network device as a function of direction from each of the network access point and the third network device and the location of the network access point and the third network device, wherein the instructions to determine the location include instructions to:
   determine a distance between the network access point and the second network device as a function of time of flight and direction, wherein the instructions to determine the distance include instructions to:
      transmit, via the network access point, a request-to-send signal to the second network device; and
      receive, via the network access point, a clear-to-send signal from the second network device;
   determine a distance between the third network device and the second network device as a function of time of flight and direction, wherein the instructions to determine the distance include instructions to:
      monitor transmission of a request-to-send signal from the third network device to the second network device; and
      monitor transmission of a clear-to-send signal from the second network device to the third network device; and
   determine a location of the second network device as a function of direction and distance from each of the network access point and the third network device and of triangulation from the network access point and the third network device.

23. The at least one non-transitory machine readable medium of claim 22, wherein the instructions to determine the distance include instructions to determine round trip delay of a signal from one of the network access point and the second network device to the other of the network access point and second network device.

24. The at least one non-transitory machine readable medium of claim 22, wherein the instructions to determine the distance include instructions to make a four-way time-of-arrival (TOA) determination.

25. The at least one non-transitory machine readable medium of claim 22, wherein the instructions to determine the distance include instructions to determine a time of flight as a function of a continuous distribution of time of flight measurements.

26. The at least one non-transitory machine readable medium of claim 22, wherein the instructions to determine the distance include instructions to:
   monitor transmissions between the network access point and the second network device via a third network device; and
   calculate, based on measurements at the second network device, time of flight between the network access point and the second network device.

27. The at least one non-transitory machine readable medium of claim 22, wherein the instructions to determine the distance include instructions to determine if the network access point or the second network device is moving and adjusting direction accordingly.

28. The at least one non-transitory machine readable medium of claim 22, wherein the instructions to determine the distance include instructions to determine a direction using each of two different bands.

\* \* \* \* \*